(12) United States Patent
Ahmed

(10) Patent No.: US 12,015,340 B2
(45) Date of Patent: Jun. 18, 2024

(54) DC-DC CONVERSION

(71) Applicant: Pulsiv Limited, Cambridge (GB)

(72) Inventor: Mohammed Ahmed, Cambridge (GB)

(73) Assignee: Pulsiv Limited, Milton (GB)

( * ) Notice: Subject to any disclaimer, the term of this patent is extended or adjusted under 35 U.S.C. 154(b) by 160 days.

(21) Appl. No.: 17/797,461

(22) PCT Filed: Feb. 4, 2021

(86) PCT No.: PCT/EP2021/052703
§ 371 (c)(1),
(2) Date: Aug. 4, 2022

(87) PCT Pub. No.: WO2021/160516
PCT Pub. Date: Aug. 19, 2021

(65) Prior Publication Data
US 2023/0082916 A1    Mar. 16, 2023

(30) Foreign Application Priority Data

Feb. 10, 2020   (GB) ........................ 2001746

(51) Int. Cl.
*H02M 3/08*    (2006.01)
(52) U.S. Cl.
CPC .................... *H02M 3/08* (2013.01)
(58) Field of Classification Search
CPC .......... H02M 3/08; H02M 3/155; H02M 3/158
See application file for complete search history.

(56) References Cited

U.S. PATENT DOCUMENTS

| | | | | |
|---|---|---|---|---|
| 4,720,668 A | * | 1/1988 | Lee | ........................ H02M 3/155 323/235 |
| 9,000,617 B2 | * | 4/2015 | Gazit | ........................ H02J 1/10 307/17 |

(Continued)

FOREIGN PATENT DOCUMENTS

| | | |
|---|---|---|
| CN | 200976546 Y | 11/2007 |
| CN | 109687711 A | 4/2019 |

(Continued)

OTHER PUBLICATIONS

International Search Report and Written Opinion for International Application No. PCT/EP2021/052703, mailed Apr. 28, 2021.

(Continued)

*Primary Examiner* — Jue Zhang
*Assistant Examiner* — Lakaisha Jackson
(74) *Attorney, Agent, or Firm* — Andrus Intellectual Property Law, LLP

(57) ABSTRACT

A DC-DC conversion scheme is described and includes a main inductor connected in series with a first circuit leg and a second circuit leg, the first and second circuit legs being arranged in parallel with one another. Each circuit leg includes a first inductor, a second inductor and a third inductor arranged in series with a primary switch, a first switched ground connection being connected to a location between the first and second inductors, and a second switched ground connection being connected to a location between the second and third inductors. The first, second and third inductors of the first and second legs are wound upon a common core.

13 Claims, 1 Drawing Sheet

(56) References Cited

U.S. PATENT DOCUMENTS

| | | | |
|---|---|---|---|
| 10,135,334 B1* | 11/2018 | Vinciarelli | H02M 1/083 |
| 2003/0205990 A1* | 11/2003 | Wittenbreder, Jr. | H02M 3/158 |
| | | | 323/222 |
| 2008/0054874 A1 | 3/2008 | Chandrasekaran et al. | |
| 2012/0249111 A1* | 10/2012 | Guo | H02M 3/158 |
| | | | 323/311 |
| 2013/0076135 A1 | 3/2013 | Zhu et al. | |
| 2017/0373601 A1* | 12/2017 | Ahmed | H02M 3/1584 |
| 2019/0348918 A1 | 11/2019 | Ojika et al. | |
| 2020/0106370 A1* | 4/2020 | Chen | H02M 1/14 |

FOREIGN PATENT DOCUMENTS

| | | |
|---|---|---|
| CN | 209283094 U | 8/2019 |
| EP | 2309631 A1 | 4/2011 |
| JP | 2018014841 A | 1/2018 |
| WO | 2016113559 A1 | 7/2016 |

OTHER PUBLICATIONS

Search Report for Great Britain Patent Application No. 2001746.3, dated Aug. 6, 2020.

\* cited by examiner

DC-DC CONVERSION

CROSS-REFERENCE TO RELATED APPLICATIONS

This application is the U.S. national stage application of International Application PCT/EP2021/052703, filed Feb. 4, 2021, which international application was published on Aug. 19, 2021, as International Publication WO 2021/160516 A1 in the English language. The International Application claims priority of Great Britain Patent Application 2001746.3, filed Feb. 10, 2020.

FIELD

This invention relates to a DC-DC conversion scheme, for example to step down an input DC voltage to a desired output DC voltage level, and accordingly step up the output current. A method and apparatus is described for use in the stepping-up or stepping-down of the input DC signal.

BACKGROUND

A number of DC-DC conversion schemes are known. They are typically used in power supplies, controlling the output voltages supplied to, for example, computers or other electronic equipment such as televisions and audio equipment, variable speed motors, electrically powered vehicles and the like. Another application in which it may be desired to provide such a scheme is in controlling the supply to an electrical power supply or distribution network or grid from an electrical generator, for example from a photovoltaic based electrical generation scheme.

One form of DC-DC conversion scheme comprises a linear regulator. An alternative scheme involves the use of a so-called Buck converter. The use of a Buck converter is advantageous compared to the use of a linear regulator in that less energy is lost as heat. FIG. 1 illustrates a simple form of Buck converter. The Buck converter shown in FIG. 1 comprises an inductor 1 and switch 2 provided in series between a supply 3 and a load 5. A second switch, in this case in the form of a diode 4, is connected across the load 5. In use, starting from a condition in which the switch 2 is open, no current will be flowing through the inductor 1 and to the load 5. If the switch 2 is subsequently closed, then the current flowing through the inductor 1 and to the load 5 will rise. The inductor 1 will produce an emf opposing the increase in current, and energy will be stored within the inductor 1. The voltage across the load 5 will be correspondingly lower than the supply. Subsequent opening of the switch 2 will interrupt the connection between the supply 3 and the load 5, and will also result in discharge of the energy stored within the inductor 1 through the load 5 and diode 3. By repeatedly opening and closing the switch 2, this cycle can be repeated. The output voltage, ie the voltage across the load 5, in such an arrangement will always be lower than the input voltage from the supply 3. These schemes allow the voltage across the load 5 to be reduced compared to that at the input or supply 3.

However, there are situations in which it is desired to provide an increased output compared to the input.

FIG. 2 illustrates an alternative known scheme the operation of which is described is WO2016/113559. The scheme of FIG. 2 comprises a main inductor 10 that is connected in series with a pair of parallel arms 12a, 12b, each arm 12a, 12b including a primary inductor 14a, 14b, a secondary inductor 16a, 16b, and a primary switch 18a, 18b, all arranged in series with one another, and a secondary switch 20a, 20b providing a switched ground connection to a point intermediate the associated primary and secondary inductors 14a, 14b, 16a, 16b. The primary and secondary inductors 14a, 14b, 16a, 16b of the first and second legs 12a, 12b are all wound upon a common magnetic core 22 and so are magnetically linked with one another. The individual inductances of the inductors 14a, 14b, 16a, 16b are very low. By way of example, each inductor 14a, 14b, 16a, 16b may be made up of only a few windings. Similarly, the main inductor 10 may be of small inductance and may include just a few windings. However, a greater number of windings may be used if desired.

With the circuit connected between an input and an output, when both of the secondary switches 20a, 20b are closed (on), the current flowing through the main inductor 10 rises by an amount Δi, inducing an emf in the main inductor 10 opposing the increase in current. From this condition, when one of the secondary switches 20a, 20b is opened (off) and the other is closed (on), the current flowing through the main inductor 10 falls by the amount Δi, the falling current inducing an emf in the main inductor 10 in the opposite direction.

By repeatedly opening and closing the secondary switches 20a, 20b, at all times ensuring that one or other of the secondary switches 20a, 20b is closed (on), there being no times at which both secondary switches 20a, 20b are both open (off), and by appropriate selection of the switching frequency, it will be appreciated that the current flowing through the main inductor 10 may be continuously changing.

The ratio of the output voltage to the input voltage can be controlled by control over the duty cycle, ie by varying the proportion of time over which both of the secondary switches 20a, 20b occupies its closed (on) position, and/or by the selection of the inductances of the secondary inductors 16a, 16b relative to the primary inductors 14a, 14b. The circuit may thus serve as a boost circuit, increasing the voltage at the output relative to that at the input by a controllable amount, the circuit being of very high efficiency, minimal losses being experienced, in use.

SUMMARY

It is an object of the invention to provide an improved DC-DC conversion scheme in which at least some of the disadvantages of known schemes are overcome or are of reduced effect. In particular, it is an object of the invention to provide a DC-DC conversion scheme in which control over the output thereof may be enhanced.

According to the present invention there is provided a DC-DC conversion scheme comprising a main inductor connected in series with a first circuit leg and a second circuit leg, the first and second circuit legs being arranged in parallel with one another, wherein each circuit leg comprises a first inductor, a second inductor and a third inductor arranged in series with a primary switch, a first switched ground connection being connected to a location between the first and second inductors, and a second switched ground connection being connected to a location between the second and third inductors, the first, second and third inductors of the first and second legs being wound upon a common core.

In such an arrangement, if the second switched ground connections of both legs are held in an open (off) position, and the first switched ground connections of both legs are cycled between their open and closed positions, it will be appreciated that the conversion scheme can be operated in the manner of the circuit of WO2016/113559 with the second and third inductances together being equivalent to the secondary inductors of the WO2016/113559, and if the first switched ground connections of both legs are held in their open (off) positions and the second switched ground connections of both legs are cycled between their open and closed positions, the conversion scheme can be operated in the manner of the circuit of WO2016/113559 but with the first and second inductances being equivalent to the primary inductors of the WO2016/113559 arrangement. Accordingly, by appropriate control over the switched ground connections, the ratio of the inductance upstream of the active switched ground connection to that downstream thereof can be varied, leading to a variation in the ratio of the input voltage to the voltage. Improved or enhanced control over the output voltage from the DC-DC conversion scheme may thus be achieved.

Each leg may include one or more additional inductors and appropriately positioned additional switched ground connections, thereby providing additional control over the output of the DC-DC conversion scheme.

BRIEF DESCRIPTION OF THE DRAWINGS

The invention will further be described, by way of example, with reference to the accompanying drawings, in which.

DETAILED DESCRIPTION OF THE DRAWINGS

Figure 1:
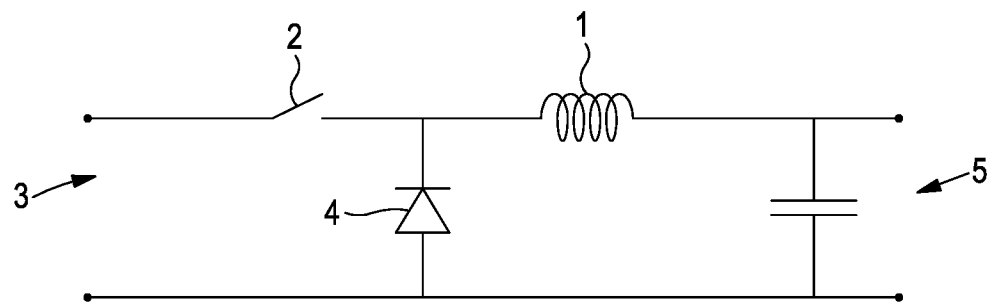
FIGS. 1 and 2 are circuit diagrams illustrating known conversion schemes.
Figure 2:
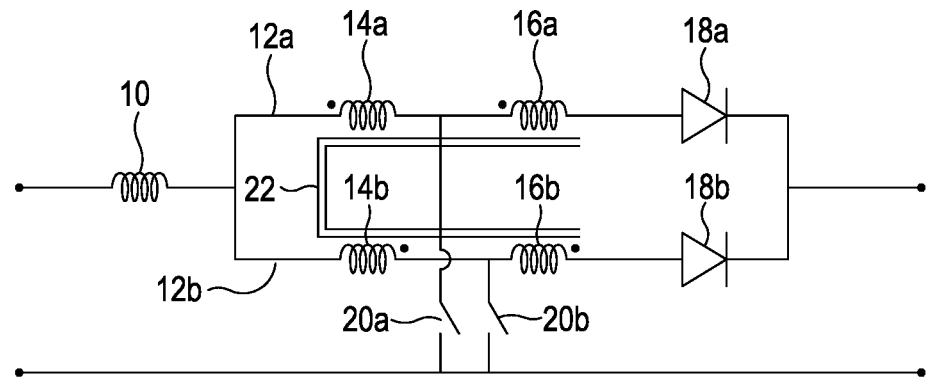
Figure 3:
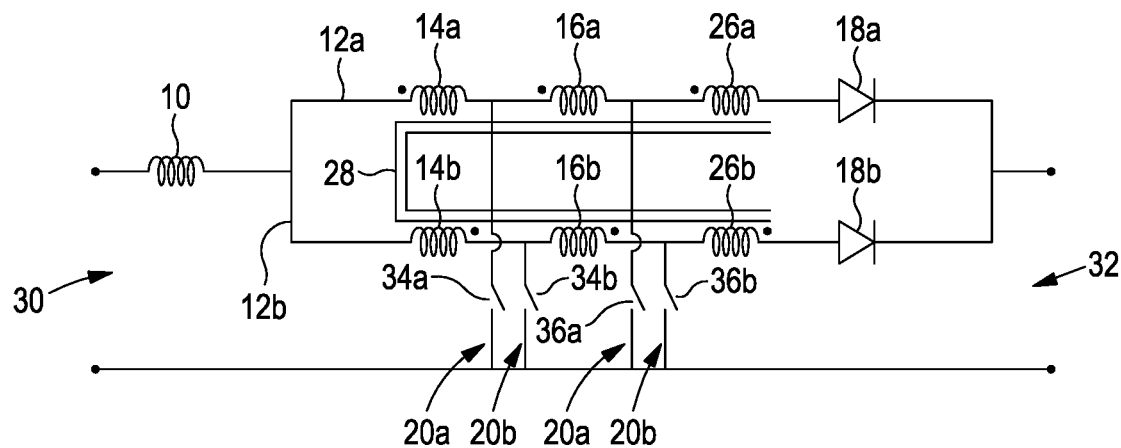
FIG. 3 is a circuit diagram illustrating a DC-DC conversion scheme in accordance with an embodiment of the invention.

The circuit of FIG. 3 is similar to that of FIG. 2, and like reference numerals and terminology will be used herein to denote like parts. The circuit of FIG. 3 comprises a main inductor 10 connected in series with a pair of circuit legs 12a, 12b that are arranged in parallel to one another, the circuit extending between an input 30 and an output 32.

The first circuit leg 12a comprising a primary inductor 14a, a secondary inductor 16a and a tertiary inductor 26a connected in series with one another and in series with a primary switch 18a, in this case in the form of a diode. Similarly, the second circuit leg 12b comprises primary, secondary and tertiary inductors 14b, 16b, 26b connected in series with one another and in series with a respective primary switch 18b, again in the form of a diode. The primary, secondary and tertiary inductors 14a, 14b, 16a, 16b, 26a, 26b of both circuit legs 12a, 12b are all wound upon a common core 28 and so are magnetically linked to one another, the winding directions being as shown in FIG. 3.

Each circuit leg 12a, 12b includes secondary switch arrangement 20a, 20b. Each of the secondary switch arrangements 20a, 20b is made up of a pair of switched ground connections. Accordingly, switch arrangement 20a comprises a first switched ground connection 34a connected to a point between the primary inductor 12a and the secondary inductor 14a and a second switched ground connection 36a connected to a point between the secondary inductor 14a and the tertiary inductor 26a. Similarly the switch arrangement 20b comprises first and second switched ground connections 34b, 36b connected to respective locations between the primary, secondary and tertiary inductors 14b, 16b, 26b.

In use, the circuit may operated in substantially the manner described in WO2016/113559, cycling the first switched ground connections 34a, 34b between their open and closed positions, and holding the second switched ground connections 36a, 36b in an open (off) condition. In this mode of operation, it will be appreciated that the secondary inductors 16a, 16b and tertiary inductors 26a, 26b can be treated as if they are combined and so, for each of the circuit legs 12a, 12b a ratio of the inductance of primary inductor 14a, 14b upstream of the active part of the secondary switch arrangements 20a, 20b to the combined inductance of the secondary and tertiary inductors 16a, 16b, 26a, 26b downstream thereof will have a first value.

By switching the operation of the circuit so that the first switched ground connections 34a, 34b are held in their open (off) positions, and the second switched ground connections 36a, 36b are cycled between their open and closed positions, it will be appreciated that the primary and secondary inductors 12a, 12b, 14a, 14b of each leg 12a, 12b can be treated as if they are combined, and so a ratio of the inductance of combination of the primary and secondary inductors 12a, 12b, 14a, 14b upstream of the active part of the secondary switch arrangements 20a, 20b to the inductance of the tertiary inductors 26a, 26b downstream thereof will have a second, different value.

By appropriate control over the secondary switch arrangements 20a, 20b, and in particular over which of the switched ground connections are in use at any given time, it will be appreciated that a ratio of the input voltage to the output voltage can be controlled. The arrangement of FIG. 3 is thus advantageous in that a greater degree of control over the operation of the DC-DC conversion scheme and the output thereof may be attained.

In the arrangement of FIG. 3, each of the inductors of the first and second legs 12a, 12b is preferably of small inductance. By way of example, they may each be of inductance less than 50 µH, preferably less than 40 µH, and more preferably less than 25 µH. The frequency at which the switch ground connections are switched, in use, is preferably in the region of 100 to 1000 kHz. It will be appreciated, however, that these are just examples and that the invention is not restricted in this regard.

Whilst the description herein relates to an arrangement in which two ratios of the inductance upstream and downstream of the active parts of the secondary switch arrangement are possible, it will be appreciated that the circuit could be modified to include additional inductors in each leg, and to include additional switched ground connections, thereby increasing the range of ratios of the input voltage to the output voltage that may be achieved, and so further enhancing control over the output of the DC-DC conversion scheme.

A number of other modifications and alterations are possible without departing from the scope of the invention as defined by the appended claims.

The invention claimed is:

1. A DC-DC conversion scheme comprising a main inductor connected in series with a first circuit leg and a second circuit leg, the first and second circuit legs being arranged in parallel with one another, wherein each circuit leg comprises a first inductor, a second inductor and a third inductor arranged in series with a primary switch, a first switched ground connection being connected to a location between the first and second inductors, and a second switched ground connection being connected to a location between the second and third inductors, the first, second and third inductors of the first and second legs being wound upon a common core.

2. The scheme according to claim 1, wherein each primary switch takes the form of a diode.

3. The scheme according to claim 1, wherein each of the first, second and third inductors is of a small inductance.

4. The scheme according to claim 3, wherein the inductance of each of the first, second and third inductors is less than 50 µH.

5. The scheme according to claim 3, wherein the inductance of each of the first, second and third inductors is less than 40 µH.

6. The scheme according to claim 3, wherein the inductance of each of the first, second and third inductors is less than 25 µH.

7. The scheme according to claim 1, wherein, in use, a selected one of the ground connections of each circuit leg is cycled between its open and closed positions at a high frequency.

8. The scheme according to claim 7, wherein the high frequency is in the region of 100-1000 kHz.

9. The scheme according to claim 1, wherein each leg further includes at least one additional inductor and at least one appropriately positioned additional switched ground connection.

10. The scheme according to claim 1, wherein each primary switch takes the form of a diode and each of the first, second and third inductors is of a small inductance.

11. The scheme according to claim 10, wherein the inductance of each of the first, second and third inductors is less than 50 µH.

12. The scheme according to claim 10, wherein the inductance of each of the first, second and third inductors is less than 40 µH.

13. The scheme according to claim 10, wherein the inductance of each of the first, second and third inductors is less than 25 µH.

* * * * *